US012117936B1

United States Patent
Bailey et al.

(10) Patent No.: US 12,117,936 B1
(45) Date of Patent: Oct. 15, 2024

(54) PREFETCH OF MICROSERVICES FOR INCOMING REQUESTS

(71) Applicant: International Business Machines Corporation, Armonk, NY (US)

(72) Inventors: Christopher Neil Bailey, Romsey (GB); Matthew Paul Wilson, Eastleigh (GB); Ian Partridge, Eastleigh (GB); Sandra Hayward, Eastleigh (GB); David Richard Jones, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 18/190,176

(22) Filed: Mar. 27, 2023

(51) Int. Cl.
*G06F 12/0862* (2016.01)

(52) U.S. Cl.
CPC .. *G06F 12/0862* (2013.01); *G06F 2212/1024* (2013.01)

(58) Field of Classification Search
CPC .............. G06F 12/0862; G06F 2212/1024
See application file for complete search history.

(56) References Cited

U.S. PATENT DOCUMENTS

| | | | |
|---|---|---|---|
| 8,429,351 B1 * | 4/2013 | Yu ................ | G06F 12/0862 711/E12.004 |
| 2019/0073275 A1 * | 3/2019 | Sarafijanovic ........ | G06F 3/0685 |
| 2020/0120000 A1 | 4/2020 | Parthasarathy | |
| 2020/0356921 A1 | 11/2020 | Curcic | |
| 2021/0117719 A1 | 4/2021 | Tiwary | |
| 2021/0234902 A1 | 7/2021 | Chandana | |
| 2021/0318961 A1 * | 10/2021 | Peterson ............. | G06F 12/0804 |
| 2022/0103643 A1 | 3/2022 | Cai | |
| 2022/0116478 A1 | 4/2022 | Biederman | |
| 2022/0206803 A1 * | 6/2022 | Chen ................ | G06F 9/5027 |
| 2022/0294818 A1 | 9/2022 | Parekh | |
| 2022/0321434 A1 * | 10/2022 | Kuriata ............. | H04L 43/0858 |
| 2023/0252697 A1 * | 8/2023 | Chung ............... | G06V 10/40 345/443 |
| 2024/0241978 A1 * | 7/2024 | Chopra ............. | G06F 21/6218 |

OTHER PUBLICATIONS

Wilson et al., "Predicting Microservices Required for Incoming Requests", U.S. Appl. No. 17/471,240, filed Sep. 10, 2021, 53 pages.

Yu et al., "Microscaler: Automatic Scaling for Microservices with an Online Learning Approach", 2019 IEEE International Conference on Web Services (ICWS), © 2019 IEEE, 9 pages.

* cited by examiner

*Primary Examiner* — Sean D Rossiter
(74) *Attorney, Agent, or Firm* — Matthew Zehrer

(57) ABSTRACT

Prefetch of microservices for incoming requests. The method determines for an incoming request a Service Level Objective (SLO) requirement for latency of a request type of the incoming request. The method generates a set of possible microservice sequences for the request including a probability of occurrence of each of the possible microservice sequences and determines a set of prefetch permutations for the set of possible microservice sequences. A latency score is calculated for each prefetch permutation and any prefetch permutations that do not meet the SLO requirement for latency of the request type are eliminated. An optimal prefetch permutation of the remaining prefetch permutations is selected by considering a total cost of the prefetch permutation based on a cost of running each microservice in the set of sequences.

20 Claims, 6 Drawing Sheets

PREFETCH OF MICROSERVICES FOR INCOMING REQUESTS

BACKGROUND

The present invention relates generally to the field of microservice computing systems, and more specifically to utilizing methods for prefetching of microservices for incoming requests.

SUMMARY

According to an embodiment of the present invention there is provided a computer-implemented method for optimizing prefetch of microservices for incoming requests, the method including the following operations (not necessarily in the following order): determining for an incoming request a Service Level Objective requirement for latency of a request type of the incoming request; generating a set of possible microservice sequences for the request including a probability of occurrence of each of the possible microservice sequences; determining a set of prefetch permutations for the set of possible microservice sequences, wherein each prefetch permutation prefetches a different permutation of the microservices in the set of sequences; calculating a latency score for each prefetch permutation based on a total time of the sequence weighted by the probability of occurrence of the sequence, wherein the total time of the sequence is a sum of the startup latency of a microservice in the sequence when not prefetched and a compute time of the microservices in the sequence; eliminating any prefetch permutations that do not meet the Service Level Objective requirement for latency of the request type; and selecting an optimal prefetch permutation of the remaining prefetch permutations by considering a total cost of the prefetch permutation based on a cost of running each microservice in the set of sequences.

According to another embodiment of the present invention there is provided a system for optimizing prefetch of microservices for incoming requests including a processor and a memory configured to provide computer program instructions to the processor to execute the function of the components. This system includes the following components and its corresponding function (not necessarily in the following order): a Service Level Objective component for determining for an incoming request a Service Level Objective requirement for latency of a request type of the incoming request; a sequence generating component for generating a set of possible microservice sequences for the request including a probability of occurrence of each of the possible microservice sequences; a prefetch permutation component for determining a set of prefetch permutations for the set of possible microservice sequences, wherein each prefetch permutation prefetches a different permutation of the microservices in the set of sequences; a permutation scoring component for calculating a latency score for each prefetch permutation based on a total time of the sequence weighted by the probability of occurrence of the sequence, wherein the total time of the sequence is a sum of the startup latency of a microservice in the sequence when not prefetched and a compute time of the microservices in the sequence; a permutation eliminating component for eliminating any prefetch permutations that do not meet the Service Level Objective requirement for latency of the request type; and a cost optimizing component for selecting an optimal prefetch permutation of the remaining prefetch permutations by considering a total cost of the prefetch permutation based on a cost of running each microservice in the set of sequences.

According to a further embodiment of the present invention there is provided a computer program product for optimizing prefetch of microservices for incoming requests, the computer program product including a computer readable storage medium having program instructions embodied therewith, the program instructions executable by a processor to cause the processor to perform certain operations. These operations include the following (not necessarily in the following order): determine for an incoming request a Service Level Objective requirement for latency of a request type of the incoming request; generate a set of possible microservice sequences for the request including a probability of occurrence of each of the possible microservice sequences; determine a set of prefetch permutations for the set of possible microservice sequences, wherein each prefetch permutation prefetches a different permutation of the microservices in the set of sequences; calculate a latency score for each prefetch permutation based on a total time of the sequence weighted by the probability of occurrence of the sequence, wherein the total time of the sequence is a sum of the startup latency of a microservice in the sequence when not prefetched and a compute time of the microservices in the sequence; eliminate any prefetch permutations that do not meet the Service Level Objective requirement for latency of the request type; and select an optimal prefetch permutation of the remaining prefetch permutations by considering a total cost of the prefetch permutation based on a cost of running each microservice in the set of sequences.

In some embodiments, the computer readable storage medium is a non-transitory computer readable storage medium and the computer readable program code may be executable by a processing circuit.

Figure 1A:
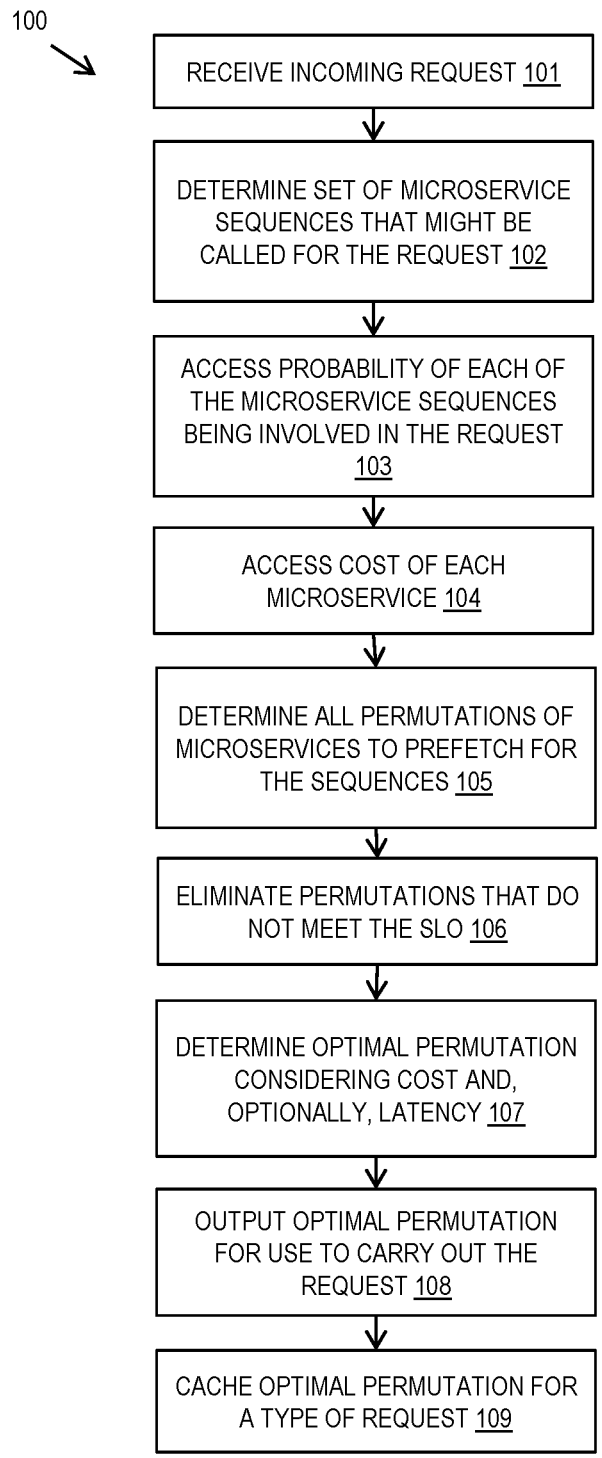
FIG. 1A is a flow diagram of an example embodiment of a method in accordance with embodiments of the present invention.

It will be appreciated that for simplicity and clarity of illustration, elements shown in the figures are not necessarily drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for determining an optimal set of microservices to be prefetched for an incoming request based on Service Level Objective (SLO) requirements for latency of a request type of the incoming request.

A cloud-based application will typically perform work in response to a request. This could be a Hypertext Transfer Protocol (HTTP) request that arrives at an ingress gateway, that determines which microservice should receive it. That service may then talk to many other services in order to complete the work requested.

Microservice applications may have a SLO relating to responsiveness which needs to be met. An SLO is typically defined as a maximum response time or "latency" for a request of the application. The latency may be a requirement either always or for a certain proportion of the time.

The time taken to scale microservices from zero will impact the responsiveness of the application to the request. Therefore, microservices that are not the initial microservice in a sequence of microservices used in response to a request may be proactively scaled by "prefetching" the microservice before it is needed. However, proactively scaling services that turn out not to be needed represents an unnecessary cost. Balancing meeting the SLO with the cost of running the services represents an optimization problem. The described method and system optimize the cost of running the system whilst meeting the requirements of the SLO.

The described method considers permutations of prefetching microservices in sequences of microservices required for an incoming request, and eliminates the permutations that cannot meet the SLO. An optimal permutation which can meet the SLO and considering the total cost of the microservices may then be determined. Optionally, the overall latency may also be balanced with the cost.

Using the described method and system, prefetch decisions may be made in order to meet a request latency required by the user's SLO and the criticality of meeting that latency.

The prefetch decision may consequently be determined directly by the SLO requirements, rather than the user needing to experiment or calculate it for themselves. The described method and system also allow for the system to respond to changes in the underlying infrastructure, such as if a service takes longer to start over time. By implementing the described solution, the "cold start problem" is mitigated in an efficient way.

The optimization of prefetch of microservices is an improvement in the technical field of computer scalability processing efficiency and more particularly in the technical field of reducing resource requirements.

The method and system can automatically determine which services must always be scaled up in order to meet SLOs and determines a scaling decision based on minimizing the cost whilst meeting the SLO.

It is common practice to decompose complex applications into many independent parts ("microservices"), that communicate with each other, where the combined set of microservices represents a complete application.

Containers are typically used for deploying microservices of applications in the cloud. Multiple containers can be run or "orchestrated" together, where each container runs a separate microservice and the combined set of microservices represents a complete application.

Cloud environments typically bill users according to the resources consumed and, despite containers being less resource hungry, the cost of such "compute" capacity can still spiral if left unchecked. Accordingly, it is desirable not to run containers unnecessarily, as an idle container still consumes resources and hence costs money.

The practice of running containers on demand, and in particular "scaling to zero" when idle, has become known as "serverless". Scaling to zero involves allowing a scaling service to terminate all instances of a service when there are no requests for the service to process. It is accompanied by a corresponding ability to scale the service up to one or more instances once such a request arrives.

The advantage of serverless is evident as containers are only scaled up and resources only consumed when there is work in the system. However, serverless comes with a cost as it takes time to start a container and the application within it. The time taken between a request coming in and the serverless application being available can be significant and this has become known as the "cold-start" problem.

This problem is exacerbated in a system of microservices where a single incoming request may require the invocation of multiple microservices before the response can be returned to the user. If each microservice in the system is serverless and has to scale from zero, the cumulative cold-start time of each microservice may cause large response latencies. In the worst case, the latency would be the sum of the cold-start time of each microservice. Hence, there is a need to minimize cold-start latency for serverless microservices.

Referring to FIG. 1A, a flow diagram 100 shows an example embodiment of the described method for determining an optimal set of microservices to be prefetched for a request based on the SLO balanced with the cost of the resources required.

The method may receive 101 an incoming request to an application. It may be checked if there is a cached optimal permutation of prefetches of microservices for the type of request, in which case, the cached optimal permutation may be used. If there is no cached optimal permutation, or if it is outdated, the following method may be carried out to generate the optimal permutation when receiving an application request or as an offline method to generate cached optimal permutations. Requests may be grouped by types of requests. The groups may be based on analysis of common request attributes (such as hypertext transfer protocol (HTTP) method, path components, and parameters) with each group having an assigned optimal permutation that may be cached. The cache eliminates a need to calculate all of the permutations and their costs on each request.

The method may determine 102 a set of sequences of microservices that may be involved in the request. A "sequence" is defined as including sequences with only one microservice called. The set of microservice sequences may include all sequences observed in historical trace data of requests.

The method may access 103 a previously determined probability of each microservice sequence in the set being involved in the request. The probabilities may be generated by observing historical request trace data.

The method may access 104 a previously determined cost for each microservice. The cost may be obtained from historical request trace data. The cost may be updated periodically.

The method may determine 105 all permutations of microservices to prefetch for the set of sequences. This is described further in relation to FIG. 1B below.

The method may eliminate 106 the permutations that cannot meet the SLO for latency for the incoming request. This is described further in relation to FIG. 1C below.

The method may determine 107 the optimal permutation which can meet the SLO whilst balancing the total cost of the permutations. This may also balance the latency of the permutations.

The method may output 108 the optimal permutation of prefetching microservices for use to carry out the incoming request.

The optimal permutation be cached 109 for a type of request for future use. Performing the calculation of the optimal permutation represents a resource cost. Therefore, an optimal permutation for each type of request may be cached. As the SLO and cost may vary over time, the calculations may be periodically repeated to ensure currency.

Figures 1B, 1C:
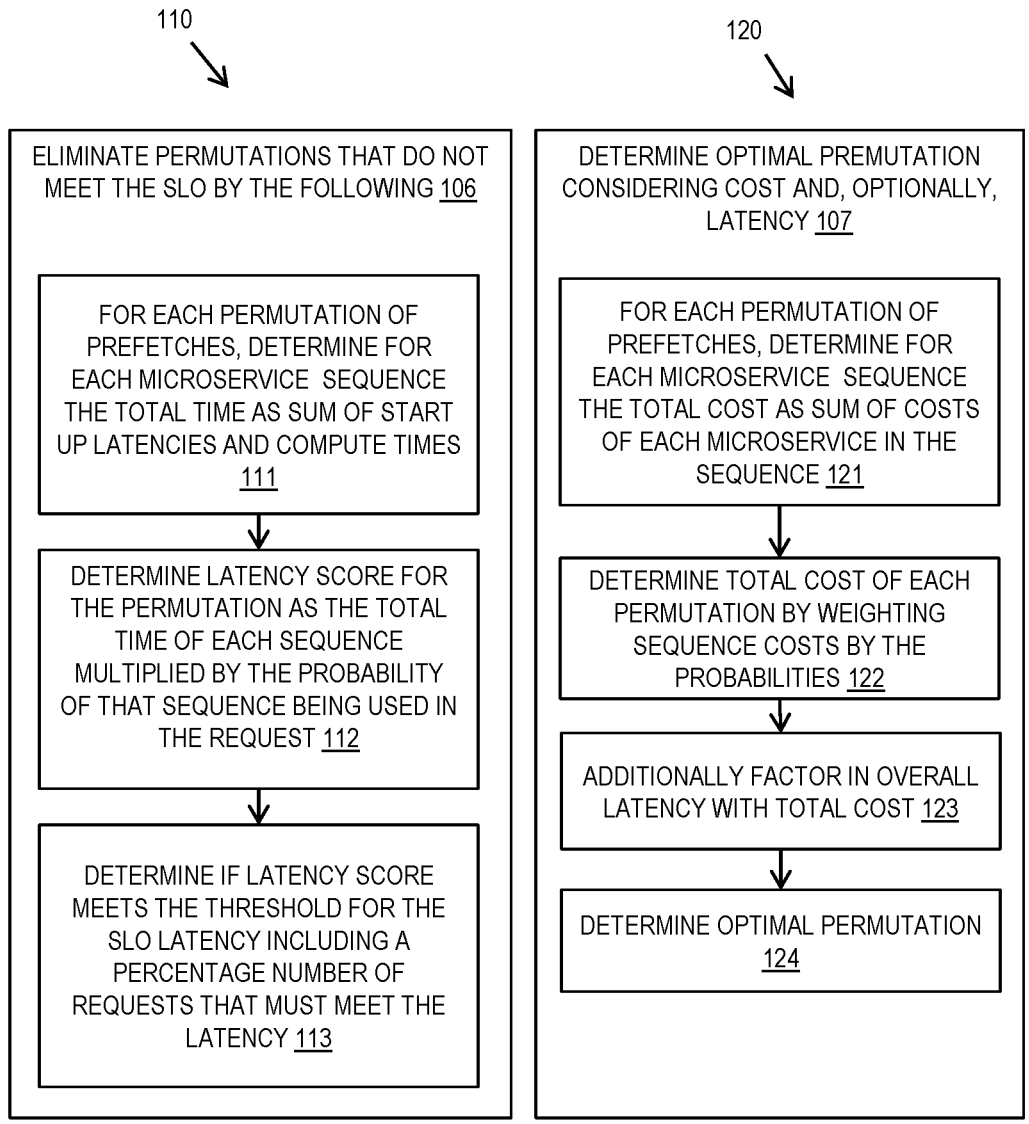
FIG. 1B is a flow diagram of a first embodiment in accordance with aspects of the present invention.
FIG. 1C is a flow diagram of a second embodiment in accordance with aspects of the present invention.

Referring to FIG. 1B, a flow diagram 110 shows an example embodiment of the aspect of the described method of eliminating 106 permutations that do not meet the SLO for requests of the application. An SLO for requests of an application may be a threshold percentage of requests that meet a required latency time of execution.

For each permutation of prefetches for the set of sequences, the method may determine 111 for each microservice sequence a total time of the sequence including start up latencies when the microservices are not prefetched and compute times of the microservices in the sequence.

The method may determine 112 a latency score for the permutation based on the total time of each microservice sequence weighted by the probability of the sequence being used in the request. The latency score may be a percentage of the requests that meet the required latency of the SLO based on the probabilities of the request sequences being used in the request.

The method may determine 113 if the latency score meets the threshold percentage for the SLO requirements. This may determine if the latency score, as a percentage of the time that the required latency is met, is greater than the required percentage.

Referring to FIG. 1C, a flow diagram 120 shows an example embodiment of the aspect of the described method of determining 107 an optimal permutation considering the cost of the microservice sequencies. This may also take into account the latency balanced with the cost of the microservice sequences.

For each permutation of prefetches of the set of sequences, the method may determine 121 for each microservice sequence a total cost of the sequence as the total time of each microservice in the sequence (including the start-up latency if not prefetched and the compute time) of the microservice multiplied by the cost of the microservice. A total cost for a permutation of prefetches is determined 122 by weighting the cost of each sequence by the probability of the sequence being in the request.

The method may additionally factor in 123 the overall latency of the permutations with the total cost. This can reduce the chance of missing the SLO. It will also improve response times, therefore improving the experience for endusers. To achieve this, multi-variate analysis may be used to find the optimal permutation of services to scale which minimizes both the cost and the latency. In a scenario where there are multiple permutations that meet the SLO, such an analysis may choose a permutation that does not have the absolute lowest cost, but has a lower latency, in order to deliver a more preferable outcome. An optimal permutation is determined 124 and output.

Applications may be decomposed into a set of microservices that cooperate in order to process a request by communicating through a variety of means. Handling a single request involves a sequence of interactions between an initial service and a subset of the application's other microservices. Historical requests of an application may be observed to determine the probability of each microservice being involved for a particular request. A predictive modeling system based on historical analysis may generate a prediction of microservices that should be scaled up in response to an incoming request to reduce start latency for serverless microservices of an application. The prediction information regarding microservices used in a request may be used in the described method and system.

Known distributed tracing tools can be applied to a network of microservices, to instrument the interactions between services that result from an initial request. The resulting tracing data can be used to identify which services were involved in processing a given request. The method may obtain tracing data of microservices of an application for historical requests. This may include obtaining the tracing data from an already existing open tracing system that is running within the ecosystem.

The method may query the tracing system to get all traces for an initial microservice name. Details describing a request, such as its path, parameters, and/or metadata such as header, are recorded with trace data that describe the paths and timings of the interactions between microservices while processing the request.

Examples of attributes of a request which may be used may include request metadata and request payload. Request metadata includes (but is not necessarily limited to) the following: HTTP headers (such as Content-Type, Content-Length, custom "x-" headers), HTTP method (such as GET, POST), HTTP query parameters, HTTP request path, event topic name. Request payload may include the HTTP body data or event message contents.

The method may analyze interactions between microservices that result from a request. The analysis may include selecting trace data by the initial microservice, grouping the trace data by common request attributes (such as hypertext transfer protocol (HTTP) method, path components, and parameters), and aggregating each group into a rule that records the common attributes, the list of microservices, and the probability (weights) of each microservice being involved.

The analyzing may generate a predictive model based on the generated rules. The predictive model describes the probability of invoking a particular microservice or sequence of microservices given a request having certain attributes.

The probability information of a sequence of microservices in a request is used in the described method and combined with data about the cost of operation and response times for each microservice to optimize the overall cost of the system while meeting SLOs for the request.

To determine the optimal set of services to prefetch for a particular request, the following information may be obtained: (1) the set of microservices that could theoretically be involved; (2) the probability of each microservice being involved, which can be generated by observing historical request trace data; (3) time to scale up each microservice; (4) Compute time taken for each microservice, for each request path, which can be obtained from historical request trace data; (5) the cost per second of each microservice, while it is idle; and (6) the SLO associated with the request, which may typically be defined by the SLO: (a) the maximum acceptable latency of a request, in seconds; and (b) the success threshold, which is the percentage of all requests which must fall below the maximum acceptable latency.

The idle cost per second of each microservice may be determined from the resource usage of the service, combined with the actual financial cost of those resources, and may depend on factors such as CPU, memory and disk usage. The idle resource usage can be measured when the service is initially deployed. The user can supply the unit cost of the resources required on target platform. Resource cost may differ between services which are deployed to different platforms, for example, in a hybrid cloud environment combining public cloud and private datacenters.

Each possible permutation p of microservices to prefetch is then considered. In the example below, a system comprised of 2 microservices is considered. This is intentionally chosen as a simplistic example to provide an illustration that is easy to describe, however the principle extends to any number of microservices.

The properties of the microservices have been previously measured as shown in Table 1.

TABLE 1

Measured properties of the microservices.

| Microservice | Start-up Time (s) | Compute Time (s) | Idle cost per second ($) |
|---|---|---|---|
| A | 1 | 2 | 0.001 |
| B | 3 | 0.5 | 0.02 |

The following permutations shown in Table 2 are considered.

TABLE 2

Permutations for prefetching the microservices.

| Permutation | Microservice A prefetched? | Microservice B prefetched? |
|---|---|---|
| p1 | No | No |
| p2 | Yes | No |
| p3 | No | Yes |
| p4 | Yes | Yes |

For each permutation, it is determined whether the SLO can be achieved. To do this the total response time of the system is calculated with the following rules: (1) If a service is not required for an observed permutation, the service is ignored; (2) If a service is required and is prefetched, it starts up immediately; and (3) If a service is required, but not prefetched, it starts up only after the request from the preceding service is completed.

Each required service must execute for its compute time after receiving a request from the preceding service. In the illustrated example, from trace data it is observed that both services A and B are involved in 70% of requests. Service A alone is involved in 20% of requests and service B alone is required in 10%. It is assumed that service A calls service B, then waits for the response from B before returning its response. The SLO latency requirement is five seconds (5 s) which is required to be meet for 90% of requests.

For permutation p2, where service A is prefetched but service B is not prefetched, the response times are shown in Table 3.

TABLE 3

Permutation p2 response times.

| Services Involved | Example probability of occurrence | Service A latency (s) | Service B latency (s) | Total compute time (s) | Total time (s) | SLO met? |
|---|---|---|---|---|---|---|
| A | 20% | 1 | — | 2 | 3 | Yes |
| B | 10% | — | 3 | 0.5 | 3.5 | Yes |
| A calls B | 70% | 1 | 6 (#1) | 2.5 | 6.5 (#2) | No |

1: A calls B after 3 seconds, then B takes a further 3 seconds to start, resulting in 4 seconds.
2: Total time is the latency of B (when called by A) (6 seconds), plus B's compute time (0.5 seconds), resulting in 4.5 seconds.

Figure 2A:
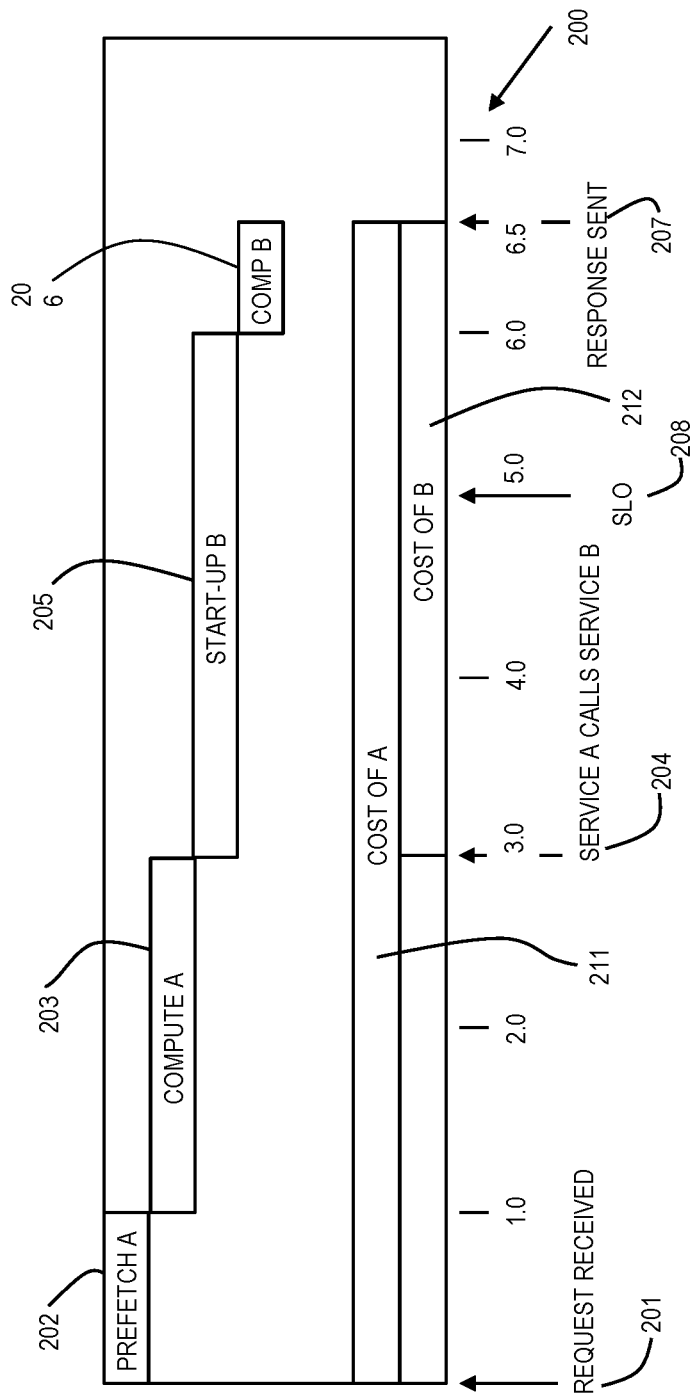
FIG. 2A is a schematic diagram illustrating a first embodiment of a microservice sequence in accordance with the present invention.

The sequence of A calls B with service A prefetched and service B not prefetched is illustrated in FIG. 2A with a timeline 200 showing the latencies and compute times. A request is received 201 and service A is prefetched 202 (which takes 1 second) and then computes 203 (which takes 2 seconds). Service A calls service B 204 and service B starts up 205 (which takes 3 seconds) and then computes 206 (which takes 0.5 seconds). The total latency until the response is sent 207 is therefore 6.5 seconds. The SLO for the request is 5.0 seconds 208. Therefore, this sequence does not meet the SLO and this sequence has a probability of occurring in 70% of requests of this type. The cost of service A 211 is incurred for 6.5 seconds and the cost of service B 212 is incurred for 3.5 seconds. Service A 211 runs until the response is sent as service B 212 returns its result to A and then A responds to the original incoming request.

In this example, the latency of 5 seconds of the SLO is met in the first two rows of Table 4 where the request just involves the service A or the service B. This means that the SLO latency of 5 seconds will only be met for 30% of requests. Therefore, permutation p2 is disregarded as the SLO requires that the latency is met for 90% of requests.

For permutation p3, where service A is not prefetched but service B is prefetched, the response times are shown in Table 4.

TABLE 4

Permutation p3 response times.

| Services Involved | Example probability of occurrence | Service A latency (s) | Service B latency (s) | Total compute time (s) | Total time (s) | SLO met? |
|---|---|---|---|---|---|---|
| A | 20% | 1 | — | 2 | 3 | Yes |
| B | 10% | — | 3 | 0.5 | 3.5 | Yes |
| A calls B | 70% | 1 | 3 | 2.5 | 3.5 (#3) | Yes |

3: Total time is the latency of B (when called by A) (3 seconds), plus B's compute time (0.5 seconds). A calls B after 3 seconds (1 s startup+2 s compute), but B was prefetched so was ready by the time it was called.

Figure 2B:
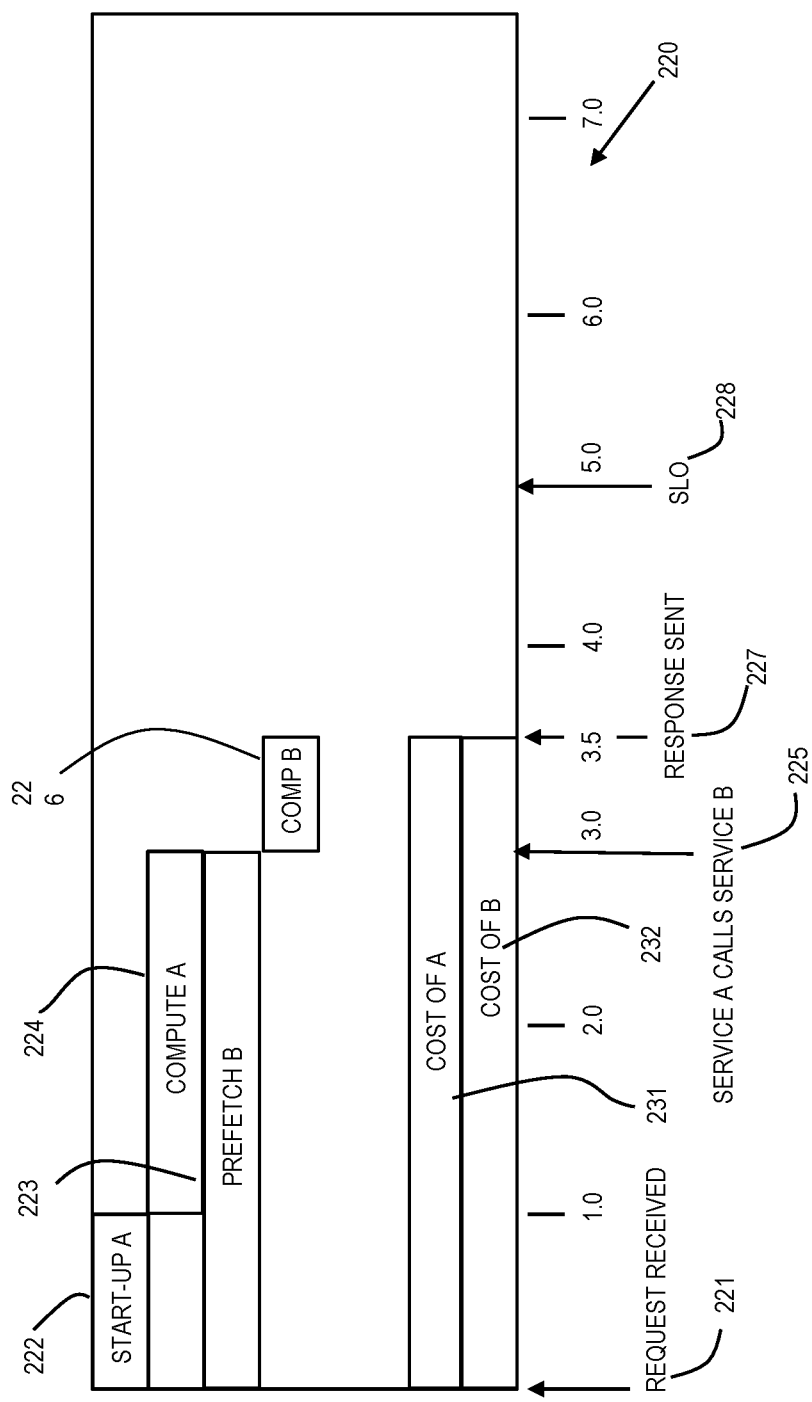
FIG. 2B is a schematic diagram illustrating a second embodiment of a microservice sequence in accordance with the present invention.

The sequence of A calls B with service A not prefetched and service B prefetched is illustrated in FIG. 2B with a timeline 220 showing the latencies and compute times. A request is received 221 and service A is started up 222 (which takes 1 second). At the same time service B is prefetched 223 (which takes 3 seconds). Service A then computes 224 (which takes 2 seconds). Service A calls service B 225 and service B computes 226 (which takes 0.5 seconds) as it is ready having been prefetched. The total latency until the response is sent 227 is therefore 3.5 seconds. The SLO for the request is 5.0 seconds 228. Therefore, this sequence does meet the SLO. The cost of service A 231 is incurred for 3.5 seconds and the cost of service B 232 is incurred for 3.5 seconds.

In this permutation p3, the SLO is met by all of the possible sequences, so this permutation is considered. After eliminating permutations which do not meet the SLO, the cost of each remaining permutation is calculated.

The cost for each service is calculated as the cost per second multiplied by the total time the service is up. The total of the cost of each observed permutation is then computed, weighted by the probability of occurrence.

The cost of permutation p3 is calculated in Table 5, where A is not prefetched and B is prefetched:

TABLE 5

The cost of permutation p3.

| Services Involved | Example probability of occurrence | Total time for A (s) | Total time for B (s) | Cost ($) |
|---|---|---|---|---|
| A | 20% | 3.0 | — | 3 s*$0.001 = $0.003 |
| B | 10% | — | 3.5 | 3.5 s*$0.02 = $0.07 |
| A calls B | 70% | 3.5 | 3.5 | 3.5 s*$0.001 + 3.5 s*$0.02 = $0.0735 |
| Total cost (weighted average) | | | | $0.003*0.2 + $0.07*0.1 + $0.0735*0.7 = $0.05905 |

For permutation p4, the cost would actually be the same using this simplistic example. However, in more complex systems with more microservices there will be multiple permutations which meet the SLO. The permutation with the lowest cost is then chosen.

Performing this calculation represents a resource cost. Therefore, the optimal permutation for each type of request may be cached. As the SLO and cost may vary over time, the calculations may be periodically repeated to ensure currency.

In some scenarios it can be advantageous to balance overall latency with total cost. This can reduce the chance of missing the SLO. It will also improve response times, therefore improving the experience for end-users. To achieve this, multi-variate analysis can be used to find the optimal permutation of services to scale which minimizes both. In a scenario where there are multiple permutations that meet the SLO, such an analysis may choose a permutation that does not have the absolute lowest cost, but has a lower latency, in order to deliver a more preferable outcome.

Figure 3:
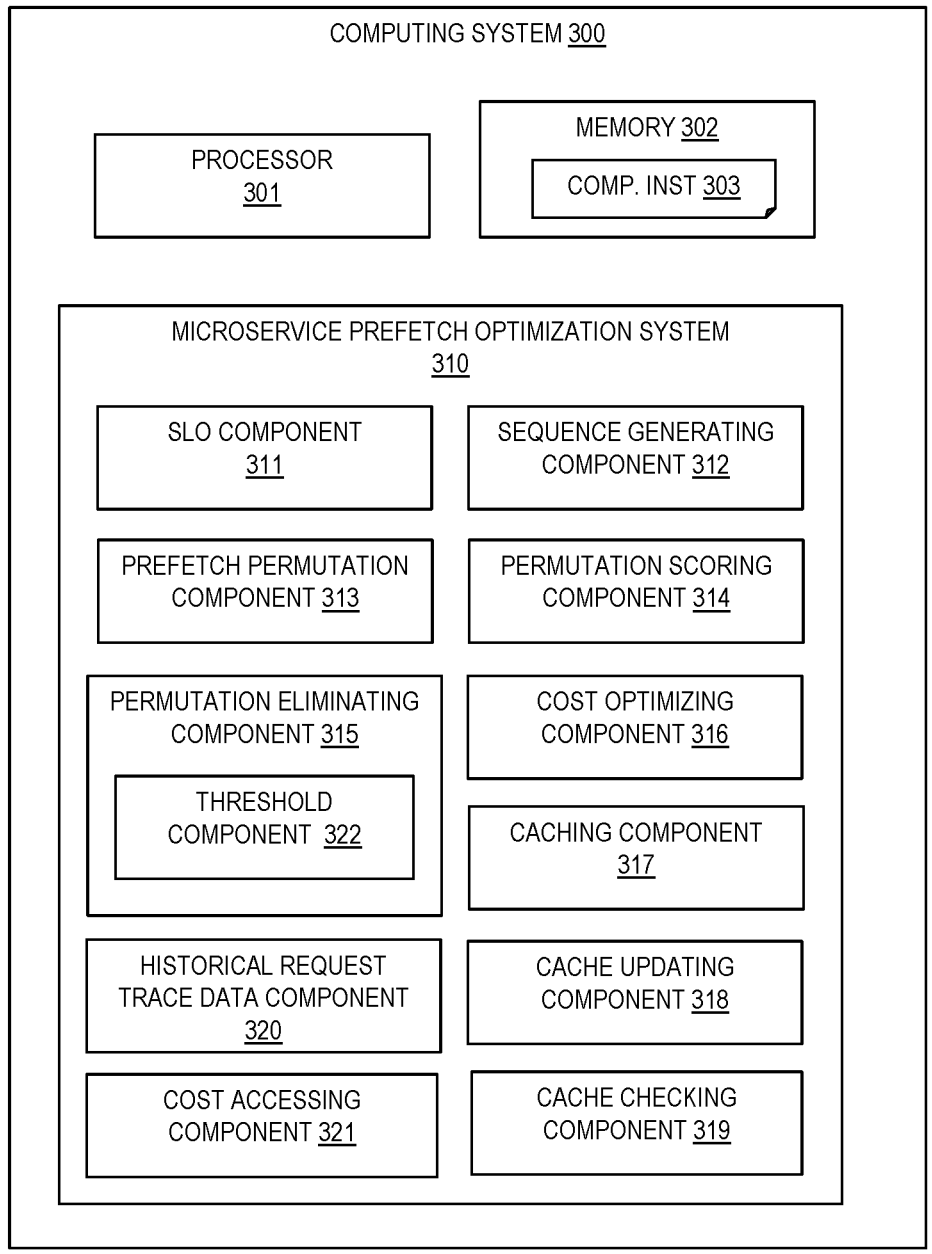
FIG. 3 is block diagram of an example embodiment of a system in accordance with embodiments of the present invention.

Referring to FIG. 3, a block diagram shows an example embodiment of a computing system 300 at which the described microservice prefetch optimization system 310 may be implemented. The computing system 300 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The microservice prefetch optimization system 310 may include a SLO component 311 for determining for an incoming request a SLO requirement for latency of a request type of the incoming request.

The microservice prefetch optimization system 310 may include a sequence generating component 312 for generating a set of possible microservice sequences for the request including a probability of occurrence of each of the possible microservice sequences.

The microservice prefetch optimization system 310 may include a prefetch permutation component 313 for determining a set of prefetch permutations for the set of possible microservice sequences, where each prefetch permutation prefetches a different permutation of the microservices in the set of sequences.

The microservice prefetch optimization system 310 may include a permutation scoring component 314 for calculating a latency score for each prefetch permutation based on a total time of the sequence weighted by the probability of the sequence, where the total time of the sequence is a sum of the startup latency of a microservice in the sequence when not prefetched and a compute time of the microservices in the sequence.

The microservice prefetch optimization system 310 may include a permutation eliminating component 315 for eliminating any prefetch permutations that do not meet the SLO requirement for latency of the request type. The permutation eliminating component 315 may include a threshold component 322 for eliminating a permutation when the latency score does not meet the threshold percentage for the SLO requirements.

The microservice prefetch optimization system 310 may include a cost optimizing component 316 for selecting an optimal prefetch permutation of the remaining prefetch permutations by considering a total cost of the prefetch permutation based on a cost of running each microservice in the set of sequences. The cost optimizing component 316 may balance the total cost with an overall latency of the prefetch permutation to minimize the combined total cost and overall latency.

The microservice prefetch optimization system 310 may include a caching component 317 for caching an optimal permutation for a type of request and using the cached optimal permutation for a subsequent incoming request of the type of request.

The microservice prefetch optimization system 310 may include a cache updating component 318 for updating the cached optimal permutation based on updated costs and updated SLO when required.

The microservice prefetch optimization system 310 may include a cache checking component 319 for checking a cache for an optimal permutation for a type of request of an incoming request.

The microservice prefetch optimization system 310 may include an historical request trace data component 320 for accessing the probability of occurrence of each of the possible microservice sequences based on historical request trace data.

The microservice prefetch optimization system 310 may include a cost accessing component 321 for accessing a cost of each microservice based on resource usage and a platform type that the application is deployed on.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 4:
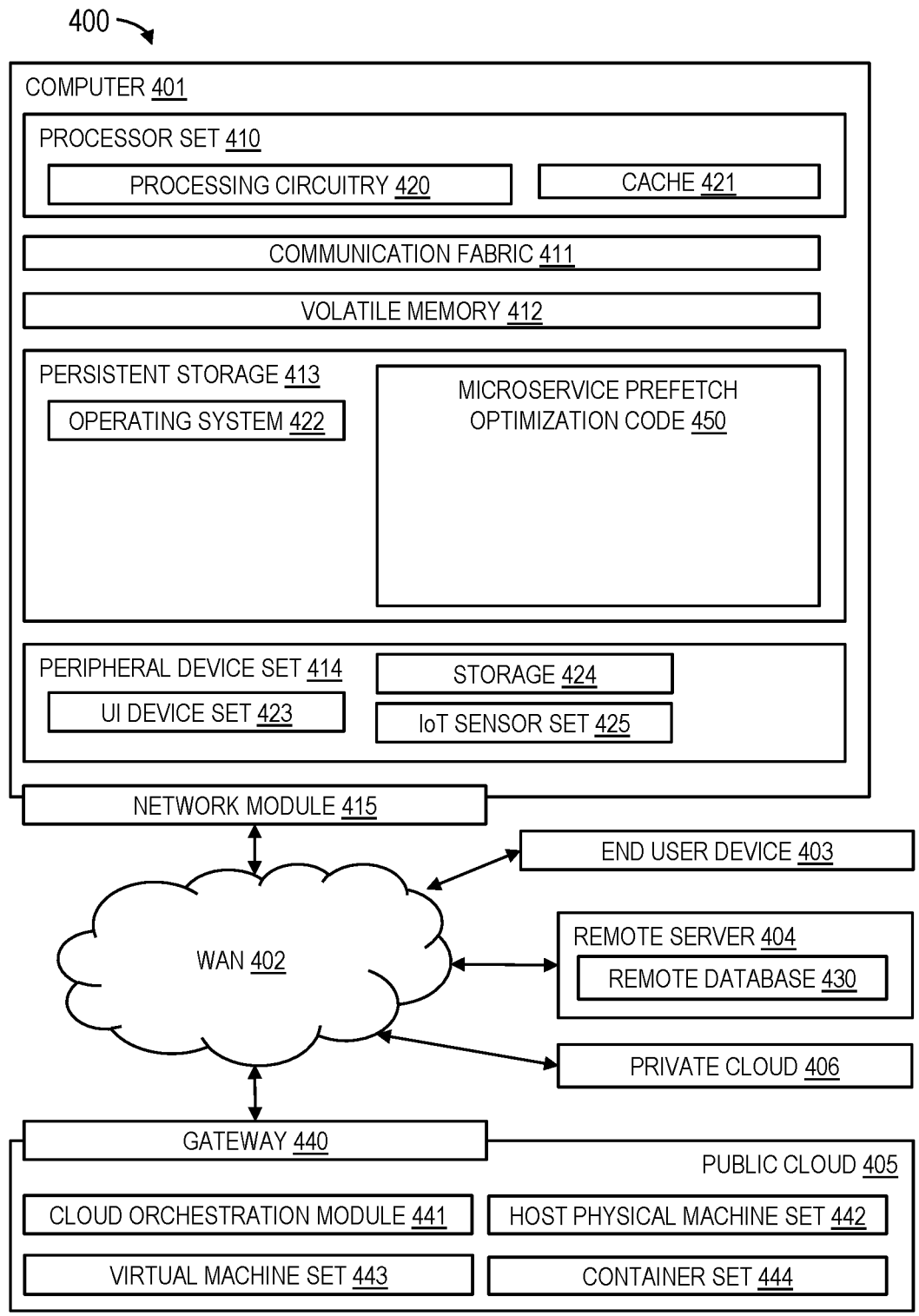
FIG. 4 is a block diagram of an example embodiment of a computing environment for the execution of at least some of the computer code involved in performing aspects of the present invention.

Referring to FIG. 4, computing environment 400 contains an example of an environment for the execution of at least some of the computer code involved in performing the inventive methods, such as microservice prefetch optimization code 450. In addition to block 450, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 450, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 450 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in block 450 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

Some helpful definitions for understanding various embodiments of the present invention are provided below:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above- similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    determining, for an incoming request, a Service Level Objective (SLO) requirement for latency of a request type of the incoming request;
    generating a set of possible microservice sequences for the request including a probability of occurrence of each of the possible microservice sequences;
    determining a set of prefetch permutations for the set of possible microservice sequences, wherein each prefetch permutation prefetches a different permutation of the microservices in the set of sequences;

calculating a latency score for each prefetch permutation based on a total time of the sequence weighted by the probability of occurrence of the sequence, wherein the total time of the sequence is a sum of the startup latency of a microservice in the sequence when not prefetched and a compute time of the microservices in the sequence;

eliminating any prefetch permutations that do not meet the SLO requirement for latency of the request type; and selecting a prefetch permutation of the remaining prefetch permutations by considering a total cost of the prefetch permutation based on a cost of running each microservice in the set of sequences.

2. The method of claim 1 wherein selecting the prefetch permutation balances the total cost with an overall latency of the prefetch permutation to minimize the combined total cost and overall latency.

3. The method of claim 1 including caching the permutation for a type of request and using the cached permutation for a subsequent incoming request of the type of request.

4. The method of claim 3 including updating the cached permutation based on updated costs and updated SLO when required.

5. The method of claim 3 including checking a cache for the permutation for a type of request of an incoming request.

6. The method of claim 1 wherein the probability of occurrence of each of the possible microservice sequences is based on historical request trace data.

7. The method as claimed in claim 1 wherein a cost of each microservice is determined based on resource usage and a platform type that the application is deployed on.

8. The method as claimed in claim 1 wherein the SLO requirement is a response being received within a defined latency period for a defined proportion of the total number of requests of the request type.

9. The method as claimed in claim 1 wherein eliminating any prefetch permutations that do not meet the SLO requirement for latency of the request type includes:

determining the latency score for the permutation based on the total time of each microservice sequence weighted by the probability of occurrence of the sequence being used in the request, with the latency score being a percentage of the requests that meet the required latency of the SLO; and eliminating a permutation when the latency score does not meet the threshold percentage for the SLO requirements.

10. The method as claimed in claim 1 wherein selecting the prefetch permutation of the remaining prefetch permutations by considering a total cost of the prefetch permutation based on a cost of running each microservice in the set of sequences weighted by the probability of occurrence of the sequences.

11. A computer system comprising:
a processor(s) set;
a machine readable storage device; and
computer code stored on the machine readable storage device, with the computer code including instructions and data for causing the processor(s) set to perform operations including the following:
determining, for an incoming request, a Service Level Objective (SLO) requirement for latency of a request type of the incoming request, generating a set of possible microservice sequences for the request including a probability of occurrence of each of the possible microservice sequences, determining a set of prefetch permutations for the set of possible microservice sequences, wherein each prefetch permutation prefetches a different permutation of the microservices in the set of sequences, calculating a latency score for each prefetch permutation based on a total time of the sequence weighted by the probability of occurrence of the sequence, wherein the total time of the sequence is a sum of the startup latency of a microservice in the sequence when not prefetched and a compute time of the microservices in the sequence, eliminating any prefetch permutations that do not meet the SLO requirement for latency of the request type, and selecting a prefetch permutation of the remaining prefetch permutations by considering a total cost of the prefetch permutation based on a cost of running each microservice in the set of sequences.

12. The computer system of claim 11 wherein the cost optimizing component balances the total cost with an overall latency of the prefetch permutation to minimize the combined total cost and overall latency.

13. The computer system of claim 11 further including:
using a caching component for caching the permutation for a type of request; and
using the cached permutation for a subsequent incoming request of the type of request.

14. The computer system of claim 13 further including:
using a cache updating component for updating the cached permutation based on updated costs and updated SLO when required.

15. The computer system of claim 13 further including:
using a cache checking component for checking a cache for the permutation for a type of request of an incoming request.

16. The computer system of claim 11 further including:
using an historical request trace data component for accessing the probability of occurrence of each of the possible microservice sequences based on historical request trace data.

17. The computer system as claimed in claim 11 further including:
using a cost accessing component for accessing a cost of each microservice based on resource usage and a platform type that the application is deployed on.

18. The computer system as claimed in claim 11 wherein the SLO requirement is a response being received within a defined latency period for a defined proportion of the total number of requests of the request type.

19. The computer system as claimed in claim 11 wherein a permutation eliminating component for eliminating any prefetch permutations that do not meet the SLO requirement for latency of the request type includes:
a threshold component for eliminating a permutation when the latency score does not meet the threshold percentage for the SLO requirements.

20. A computer program product comprising:
a machine readable storage device; and
computer code stored on the machine readable storage device, with the computer code including instructions and data for causing a processor(s) set to perform operations including the following:

determining for an incoming request a Service Level Objective (SLO) requirement for latency of a request type of the incoming request, generating a set of possible microservice sequences for the request including a probability of occurrence of each of the possible microservice sequences, determining a set of prefetch permutations for the set of possible microservice sequences, wherein each prefetch permutation prefetches a different permutation of the microservices in the set of sequences, calculating a latency score for each prefetch permutation based on a total time of the sequence weighted by the probability of occurrence of the sequence, wherein the total time of the sequence is a sum of the startup latency of a microservice in the sequence when not prefetched and a compute time of the microservices in the sequence, eliminating any prefetch permutations that do not meet the SLO requirement for latency of the request type, and selecting a prefetch permutation of the remaining prefetch permutations by considering a total cost of the prefetch permutation based on a cost of running each microservice in the set of sequences.

* * * * *